United States Patent

Suzuki et al.

[11] Patent Number: 5,866,917
[45] Date of Patent: Feb. 2, 1999

[54] METHOD AND APPARATUS FOR EVALUATING THE LAYERS

[75] Inventors: Takahisa Suzuki; Motoji Ohta; Masaru Suzuki, all of Minami-ashigara, Japan

[73] Assignee: Fuji Xerox Co., Ltd., Tokyo, Japan

[21] Appl. No.: 692,751

[22] Filed: Aug. 7, 1996

[30] Foreign Application Priority Data

Aug. 9, 1995 [JP] Japan ................................ 7-202979
Oct. 5, 1995 [JP] Japan ................................ 7-258462

[51] Int. Cl.$^6$ ............................................. G01V 8/00
[52] U.S. Cl. ............................ 250/559.27; 250/559.28; 356/381; 356/382; 430/30
[58] Field of Search ............................. 356/381, 382; 250/559.27, 559.28; 430/30

[56] References Cited

U.S. PATENT DOCUMENTS

| | | | |
|---|---|---|---|
| 4,555,767 | 11/1985 | Case et al. ............................. | 364/563 |
| 4,666,305 | 5/1987 | Mochida et al. ...................... | 356/381 |
| 5,048,960 | 9/1991 | Hayashi et al. ...................... | 356/319 |
| 5,403,688 | 4/1995 | Ashiya et al. ........................ | 430/84 |

FOREIGN PATENT DOCUMENTS

| | | | |
|---|---|---|---|
| A-4-52653 | 2/1992 | Japan ................................ | G03G 5/00 |
| A-4-336540 | 11/1992 | Japan ................................ | G03G 5/05 |
| A-6-130683 | 5/1994 | Japan ................................ | G03G 5/05 |

*Primary Examiner*—Nam Nguyen
*Assistant Examiner*—Steven H. VerSteeg
*Attorney, Agent, or Firm*—Oliff & Berridge, PLC

[57] ABSTRACT

Light is led from a light source to the surface of a detecting area on an intermediate product by way of a route of an optical fiber and a probe. After reaching the detecting area, light successively passes through the layers formed on a conductive substrate of the intermediate product, and is reflected on the surface of the conductive substrate. The reflected light reversely travels through the layers and a reverse route of the probe and the optical fiber, and reaches a spectrophotometer. A spectral absorption ratio calculating unit in a film-thickness calculating section calculates spectral absorption ratios from a spectrum produced by the spectrophotometer. A thickness converting unit substitutes the spectral absorption ratios into a multiple regression equation that is read out of a multiple regression memory, and produces the film thickness or the characteristic value dependent on the film thickness.

13 Claims, 2 Drawing Sheets

FIG. 3

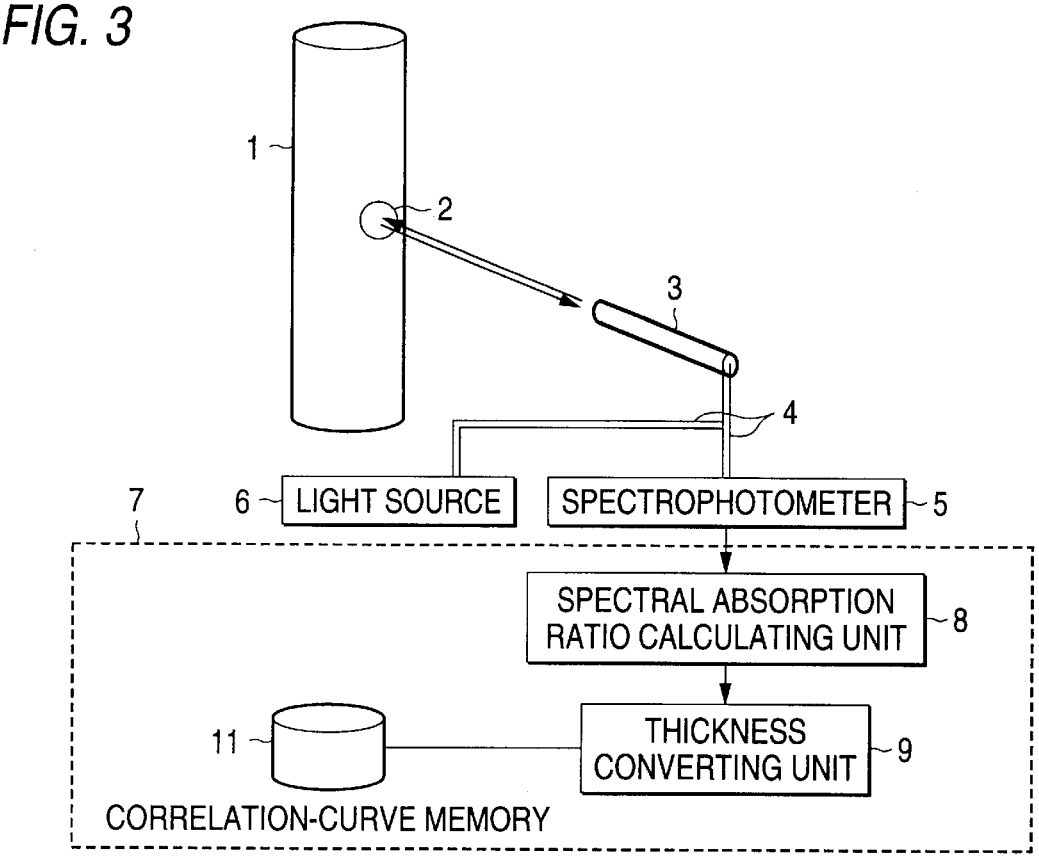

| EXPLANATORY VARIABLE | MEANING OF VARIABLE |
|---|---|
| X1 | QUANTITY OF LIGHT OF THE BOTTOM PEAK WAVELENGTH/QUANTITY OF THE LIGHT PEAK WAVELENGTH |
| X2 | QUANTITY OF LIGHT OF THE WAVELENGTH A/ QUANTITY OF THE LIGHT OF PEAK WAVELENGTH |
| X3 | QUANTITY OF LIGHT OF THE WAVELENGTH B/ QUANTITY OF LIGHT OF THE PEAK WAVELENGTH |
| X4 | QUANTITY OF LIGHT OF THE WAVELENGTH C/ QUANTITY OF LIGHT PEAK OF THE WAVELENGTH |
| X5 | THE SURFACE ROUGHNESS Ra OF A CONDUCTIVE SUBSTRATE |

METHOD AND APPARATUS FOR EVALUATING THE LAYERS

BACKGROUND OF THE INVENTION

The present invention relates to a method and an apparatus for evaluating the layer thickness of a photoreceptor having a plural number of layers layered on a conductive substrate formed thereon. The invention relates to a method and an apparatus for manufacturing photoreceptors.

In the electrophotographic apparatus, such as copying machines and printers, the photoreceptor used therein having a layered structure consisting of an under coat layer, a charge generating layer, and a charge transport layer successively layered on a conductive substrate is known. In manufacturing the photoreceptor, photosensitive coating liquid is first prepared by dissolving or dispersing organic photoconductive material and binder resin into organic solvent, a conductive substrate is successively coated with the coating liquid, and then the resultant is dried.

Various methods of coating the photosensitive coating liquid, employed in the photoreceptor manufacturing process, are known. Of those known coating methods, a dipping method is widely used because of high productivity. In the dipping method, a conductive substrate is dipped into a bath containing coating liquid, and pulled out of the bath at a preset speed.

However, this dipping method is disadvantageous in that the photoreceptor is likely to be formed droopy. This brings about various drawbacks, for example, an irregular coating of the photosensitive layer, formation of stripes, great thickness difference between the upper part of the photosensitive layer and the lower part, and the like. This leads to formation of a defective image, for example, an image having an irregular optical image density. Organic solvent, easy to volatilize, is frequently used for the coating liquid. Where such a solvent is used, the solvent volatilizes from the coating liquid in the bath, and the viscosity and concentration of the coating liquid varies. Consequently, it is difficult to perform the coating process under fixed conditions.

In manufacturing the photoreceptors, to detect some variation in the coating process, the thickness values of the formed layers are measured and evaluated. The results of the evaluation are fed back to the coating process to adjust the thickness. The film thickness measuring methods, currently used, are generally categorized into a contact film-thickness measuring method and a noncontact film-thickness measuring method. The former method uses a step measuring meter, an eddy-current film-thickness measuring meter, or the like. The latter is based on a color difference method, an interference method, a light absorption method, or the like.

The film-thickness evaluation by the interference method utilizes the interference effects by a multiple reflection. It is frequently used for measuring the thickness of the transparent layers, for example, the under coat layer and the charge transport layer because of its easy and short time evaluation. A technique disclosed in Japanese Patent Laid-Open Publication No. Hei. 4-336540 uses this film-thickness evaluation to measure and evaluate the thickness of the under coat layer and the charge transport layer, and controls the coating rate in the coating process in accordance with the evaluation results.

The film-thickness evaluation by the light absorption method utilizes such a nature that a quantity of light absorbed by the film varies with the film thickness. It is frequently used for measuring the thickness of the layers of the photoreceptor because of its easy and short time evaluation. In this method, infrared absorption is used for measuring the thickness of the transparent layers, for example, the under coat layer and the charge transport layer. For measuring the thickness of the layer containing pigment dispersed therein, such as the charge generating layer, visible light absorption is frequently used.

Practical characteristic values obtained by the light absorption method are typically the absorbance and the reflectivity. These characteristic values are each expressed as a ratio of the quantities of reflecting light before and after the film formation or a ratio of the quantities of light incident on and reflecting from the film formed. The characteristic values often correlates with the thickness of a film to be measured. In this case, the characteristic value may be converted into the corresponding film thickness by using a conversion formula previously formed. A method for converting the characteristic value to the film thickness is disclosed in Japanese Patent Laid-Open Publication No. Hei. 6-130683. In this method, a partial area having no under coat layer formed therein is formed outside the image forming area on the surface of the conductive substrate, and a charge generating layer is formed on this area. A spectrophotometer gathers light absorbed in the partial area and produces a spectrum of the light. A ratio of the quantities of light of a specific single wavelength incident on and reflecting from the partial area, viz., absorbance, is calculated from the spectrum, and converted into the corresponding thickness of the film.

In calculating the absorbance from the ratio of the quantities of light incident on and reflecting from the coated film by using the spectrophotometer, for example, the reflecting light is measured by the spectrophotometer, and hence the quantity of light obtained is only the quantity of the reflecting light. Therefore, it is necessary to use a sensor for measuring the quantity of the incident light indispensable for the calculating of the absorbance. In the method using the sensor, it is estimated that optical path variations in the optical system, viz., a variation of the quantity of light from a light source and a variation of the distance between an object to be measured and the light source, greatly affect a variation of measured values. For this reason, this method is not practical. When the reflectivity of the conductive substrate per se varies, that is, the reflectivity values of the objects to be measured are not uniform, the quantity of the reflecting light irrelevant to the light absorption by the film varies. The result is a great variation of the measured values. The film thickness of the photoreceptor is not always uniform. This necessitates the irregularity evaluation, such as thickness irregularity in the circumferential and axial directions, and droopy state of the film.

The area on the photoreceptor that can be evaluated in its thickness by the converting method as described in Japanese Patent Laid-Open Publication No. Hei. 6-130683 is only the partial area having no under coat layer, viz., the upper end of the film. In case that the method of the publication is applied to an area having the under coat layer formed thereon, if the adverse effect by the interference is canceled, a variation of the thickness of the under coat layer leads to a variation of the optical path, and hence a great variation of the measured values. In this respect, this method is also not practical. It is known that the film at that location has a great thickness irregularity. Therefore, the irregularity evaluation, such as thickness irregularity in the circumferential and axial directions, and droopy state of the film, is essential. In this sense, the thickness evaluation method under discussion needs some improvement.

The measurement of the thickness of the layers of the photoreceptor may be applied to the evaluation of the characteristic value of the photoreceptor, which has a correlation to the thickness of the photoreceptor layers. For example, an electrical characteristic correlating with the thickness of the charge generating layer may be evaluated on the basis of the thickness of the charge generating layer. An evaluation method for evaluating a sensitivity to light having a relation with the thickness of the charge generating layer is disclosed in Japanese Patent Laid-Open Publication No. Hei. 4-52653. These characteristic values per se are often used as substitute characteristics to control the coating process.

In some photoreceptors which require a process for preventing interference fringes, for example, those used for digital color copying machines, printers, and the like, the roughness on the substrate surface and the interfaces of the under coat layer are set at high values. Various methods to make those surfaces rough are known and practically used. A first category of the surface roughening methods mechanically roughens the surfaces, and includes a Horning method, an etching method, a steel ball drop/impact method, a roughened cylinder applying method, a grinding/cutting method, a laser irradiation method, a high-pressure water jetting method, and the like. A second category of the roughening method chemically processes or oxidizes the substrate surface, and includes an anode oxidizing method, a bermite process, a heat oxidizing method and the like. A third category of the roughening method places an intermediate layer for preventing interference between the photosensitive layer and the surface of the substrate.

The roughness values of the surface roughness of the thus processed conductive substrate are not uniform over the same surface and among different conductive substrates. In the evaluation method based on the light absorption, the light reflected from the layer of the photoreceptor is affected by the surface roughness, so that the quantity of the reflected light varies. Accordingly, the varied roughness values bring about a large variation of the characteristic values based on the quantity of the reflecting light, such as the absorbance and the reflectivity. This results in poor measurement accuracy. When the characteristic values of the film thickness, i.e., the absorbance and the reflectivity, are used as substitute characteristic, these values are also greatly varied. Further, when the coating process is controlled by using the characteristic values, the evaluated values greatly deviated from the true values will be fed back to the coating process.

To remove the variation of the roughness values among different substrates, the absorbance and the reflectivity may be obtained from the quantities of light absorbed by the layer and the light reflected from the same before and after the coating process. To realize this, the same measuring conditions must be set for both the measurements before and after the coating process. However, it is difficult to set up the same conditions since if the same measuring equipment is used, different coating processes are carried out at different times. Accordingly, the power source voltage varies, and with the variation of the power source voltage, the quantity of light from a light source varies, and hence the characteristic values, such as the absorptive value and the reflectivity, also vary.

SUMMARY OF THE INVENTION

The present invention has been made in view of the above circumstances and has an object to provide a method and an apparatus for exactly evaluating the film thickness and/or the characteristic value dependent on the film thickness during a process of manufacturing photoreceptors, and a method and an apparatus for manufacturing photoreceptors on the basis of the evaluation results.

To achieve the above object, aspect 1 sets forth an apparatus for evaluating an object having layers formed on a substrate comprising:

spectral characteristic detecting means for detecting the spectral characteristic of light reflected from the surface of the object having at least a layer to be evaluated being formed thereon; and calculating means for generating the spectral absorption ratios on the basis of the spectral characteristic received from the spectral characteristic detecting means and for calculatively processing the spectral absorption ratios to produce the thickness of the layer to be evaluated or the characteristic value on the layer thickness.

Aspect 2 sets forth the evaluating apparatus of aspect 1 comprising:

spectral characteristic detecting means for detecting the spectral characteristic of light reflected from the surface of the object having at least a layer to be evaluated being formed thereon; and calculating means for generating the spectral absorption ratios on the basis of the spectral characteristic received from the spectral characteristic detecting means and for calculating a regression equation of which the explanatory variables are the spectral absorption ratios and the object variable is the thickness of the layer to be evaluated or the characteristic value on the layer thickness, to thereby produce the thickness of the layer to be evaluated or the characteristic value on the layer thickness.

Aspect 3 sets forth the evaluating apparatus of aspect 1 comprising:

spectral characteristic detecting means for detecting the spectral characteristic of light reflected from the surface of the object having at least a layer to be evaluated being formed thereon; and calculating means for generating the spectral absorption ratios on the basis of the spectral characteristic received from the spectral characteristic detecting means and for calculating a regression equation of which the explanatory variables are the spectral absorption ratios defined by the minimum absorption wavelength and an arbitrary wavelength and the object variable is the thickness of the layer to be evaluated or the characteristic value on the layer thickness, to thereby produce the thickness of the layer to be evaluated or the characteristic value on the layer thickness.

Aspect 4 sets forth the evaluating apparatus of aspect 1 comprising:

spectral characteristic detecting means for detecting the spectral characteristic of light reflected from the surface of the object having at least a layer to be evaluated being formed thereon; and calculating means for generating the spectral absorption ratios on the basis of the spectral characteristic received from the spectral characteristic detecting means and for calculating a multiple regression equation of which the explanatory variables are the spectral absorption ratios and the object variable is the thickness of the layer to be evaluated or the characteristic value on the layer thickness, to thereby produce the thickness of the layer to be evaluated or the characteristic value on the layer thickness.

Aspect 5 sets forth the evaluating apparatus of aspect 1 comprising:

spectral characteristic detecting means for detecting the spectral characteristic of light reflected from the surface of the object having at least a layer to be evaluated being formed thereon; and calculating means for generating the spectral absorption ratios on the basis of the spectral characteristic received from the spectral characteristic detecting means and for calculating a multiple regression equation of which the explanatory variables are the spectral absorption ratios and the surface roughness of the substrate and the object variable is the thickness of the layer to be evaluated or the characteristic value on the layer thickness, to thereby produce the thickness of the layer to be evaluated or the characteristic value on the layer thickness.

Aspect 6 sets forth the evaluating apparatus of aspect 1, wherein the object having layers formed on a substrate is a photoreceptor.

Aspect 7 sets forth the evaluating apparatus of aspect 6, wherein the substrate is processed in advance for preventing interference fringes.

Aspect 8 sets forth a method for evaluating an object having layers formed on a substrate comprising the steps of:

detecting the spectral characteristic of light reflected from the surface of the object after at least a layer to be evaluated being formed thereon;

generating the spectral absorption ratios on the basis of the detected spectral characteristic; and calculatively processing the spectral absorption ratios to produce the thickness of the layer to be evaluated or the characteristic value on the layer thickness.

Aspect 9 sets forth the evaluating method of aspect 8 comprising the steps of:

detecting the spectral characteristic of light reflected from the surface of the object having at least a layer to be evaluated being formed thereon;

generating the spectral absorption ratios on the basis of the detected spectral characteristic; and calculating a regression equation of which the explanatory variables are the spectral absorption ratios and the object variable is the thickness of the layer to be evaluated or the characteristic value on the layer thickness, to thereby produce the thickness of the layer to be evaluated or the characteristic value on the layer thickness.

Aspect 10 sets forth the evaluating method of aspect 8 comprising the steps of:

detecting the spectral characteristic of light reflected from the surface of the object having at least a layer to be evaluated being formed thereon;

generating the spectral absorption ratios on the basis of the detected spectral characteristic; and calculating a regression equation of which the explanatory variables are the spectral absorption ratios defined by the minimum absorption wavelength and an arbitrary wavelength and the object variable is the thickness of the layer to be evaluated or the characteristic value on the layer thickness, to thereby produce the thickness of the layer to be evaluated or the characteristic value on the layer thickness.

Aspect 11 sets forth the evaluating method of aspect 8 comprising the steps of:

detecting the spectral characteristic of light reflected from the surface of the object having at least a layer to be evaluated being formed thereon;

generating the spectral absorption ratios on the basis of the spectral characteristic received from the spectral characteristic detecting means; and calculating a multiple regression equation of which the explanatory variables are the spectral absorption ratios and the object variable is the thickness of the layer to be evaluated or the characteristic value on the layer thickness, to thereby produce the thickness of the layer to be evaluated or the characteristic value on the layer thickness.

Aspect 12 sets forth the evaluating method of aspect 8 comprising the steps of:

detecting the spectral characteristic of light reflected from the surface of the object having at least a layer to be evaluated being formed thereon;

generating the spectral absorption ratios on the basis of the spectral characteristic received from the spectral characteristic detecting means; and calculating a multiple regression equation of which the explanatory variables are the spectral absorption ratios and the surface roughness of the substrate and the object variable is the thickness of the layer to be evaluated or the characteristic value on the layer thickness, to thereby produce the thickness of the layer to be evaluated or the characteristic value on the layer thickness.

Aspect 13 sets forth the evaluating method of aspect 8, wherein the object having layers formed on a substrate is a photoreceptor.

Aspect 14 sets forth the evaluating method of aspect 13, wherein the substrate is processed in advance for preventing interference fringes.

Aspect 15 sets forth an apparatus for manufacturing photoreceptors having a plural number of layers formed on a substrate comprising the evaluating apparatus of aspect 6;

the result of the evaluation performed by the evaluating apparatus being fed back to the process of forming the layer to be evaluated.

Aspect 16 sets forth a method for manufacturing photoreceptors having a plural number of layers formed on a substrate comprising the steps of:

forming at least a layer to be evaluated;

evaluating the thickness of the layer to be evaluated by the evaluating method of aspect 8; and feeding back the result of the evaluation to the process of forming the layer to be evaluated.

BRIEF DESCRIPTION OF THE DRAWINGS

FIG. 3 is a diagram schematically showing a second embodiment of an evaluation apparatus for evaluating a photoreceptor according to the present invention.

FIGS. 4A and 4B are explanatory diagram for explaining a multiple regression equation used in the first embodiment of the present invention.

DETAILED DESCRIPTION OF THE PREFERRED EMBODIMENTS

Figure 1:
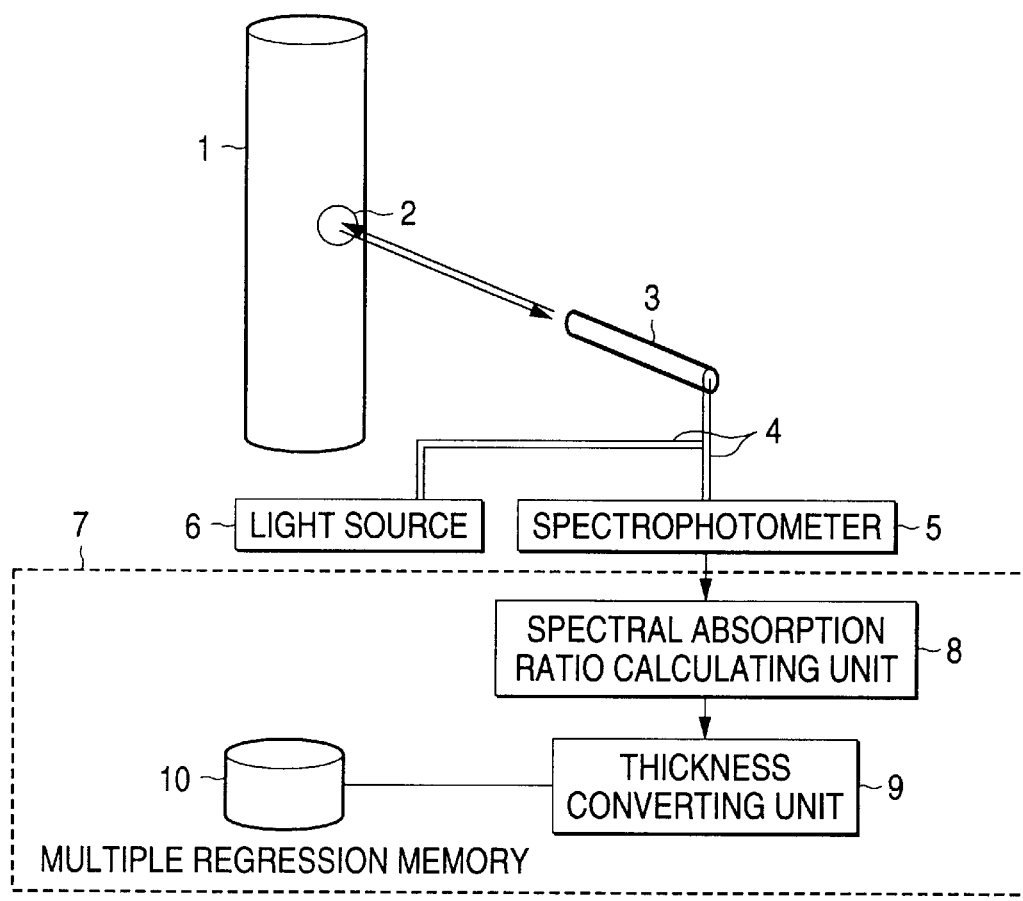
FIG. 1 is a diagram schematically showing a first embodiment of an evaluation apparatus for evaluating a photoreceptor according to the present invention.

FIG. 1 is a diagram schematically showing a first embodiment of an evaluation apparatus for evaluating a photoreceptor according to the present invention. In the figure, reference numeral 1 designates an intermediate product; 2, a detecting area of the product; 3, a probe; 4, an optical fiber; 5, a spectrophotometer; 6, a light source; 7, a film-thickness calculating section; 8, a spectral absorption ratio calculating unit; 9, a thickness converting unit; and 10, a multiple regression memory.

As described above, the photoreceptor is formed in a manner that an under coat layer, a charge generating layer, a charge transfer layer, and the like are successively layered on a conductive substrate in this order. In the photoreceptor which indispensably requires the interference fringes preventing process, a roughness of the substrate surface or the interfaces of the under coat layer is increased. The specific methods for the process of layering those layers and the interference fringes preventing process are also as referred to above. The intermediate product 1 is a photoreceptor after at least the layers to be evaluated are formed on the conductive substrate. In this embodiment, the intermediate product 1 indicates such a product that the surface of the conductive substrate has been processed in advance for preventing the interference fringes, and at least a charge generating layer and a charge transfer layer has been formed the conductive substrate.

For the light source 6, a general light source, such a halogen or Nichrome light source, is selectively used for the absorption wavelength region of a layer to be measured. A halogen light source is used for the charge generating layer, for example, in which pigment is dispersed therein and a variation of a light absorption by the film peaks in a visible rays region. A Nichrome lamp, usually used as an infrared rays light source, is used for the charge transfer layer and the under coat layer. Other suitable light sources may be used instead of the above ones, for the same purpose.

Light is emitted from the light source 6, goes through the optical fiber 4 and the probe 3, and reaches the detecting area 2. After reaching the detecting area 2, the light passes successively through the layers formed on the conductive substrate, and is reflected on the surface of the conductive substrate, and passes through the same route in the reverse direction and returns to the probe 3. After reaching the probe 3, the light passes through the optical fiber 4 and is focused on the spectrophotometer 5.

Upon receipt of the light from the substrate surface, the spectrophotometer 5 gathers the spectrum of the reflecting light from the substrate surface. The film-thickness calculating section 7 receives the spectrum from the spectrophotometer 5, and calculates the thickness of the layer, and the characteristic value of the layer under measurement, which depends on the film thickness. The film-thickness calculating section 7 includes the spectral absorption ratio calculating unit 8, the thickness converting unit 9, the multiple regression memory 10, and the like. The film-thickness calculating section 7 may be constructed by a data processor, for example, a personal computer.

Figure 2:
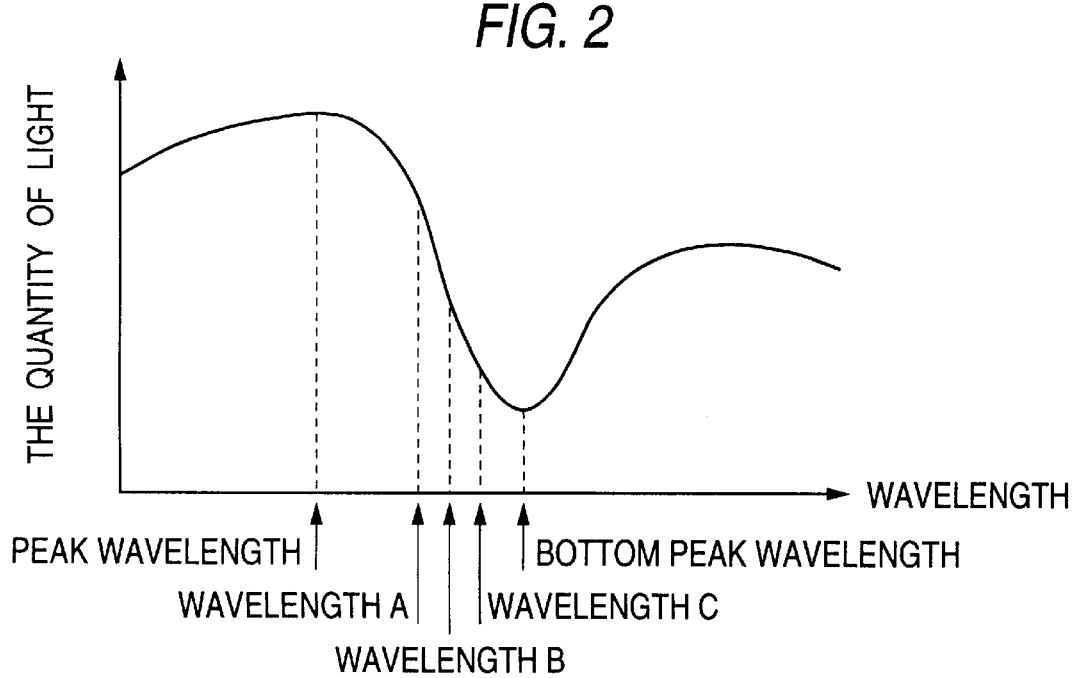
FIG. 2 is a graph useful in explaining an example of the spectral characteristic and a spectral absorption ratio.

The spectral absorption ratio calculating unit 8 calculatively obtains, on the basis of the spectrum received from the spectrophotometer 5, a ratio of a quantity of light of an arbitrary wavelength and a quantity of light of a peak wavelength which provides the largest quantity of light, or a bottom wavelength which provides the smallest quantity of light. The ratio is called a "spectral absorption ratio". FIG. 2 is a graph useful in explaining an example of the spectral characteristic and a spectral absorption ratio. An example of the spectrum of the light, which have gone to and returned from the substrate surface through the respective layers formed thereon, is graphically illustrated in FIG. 2. The spectrum as illustrated is produced from the spectrophotometer 5. As known, the spectrum gathered shows the facts that the films absorbs light, and that a quantity of reflecting light, viz., a degree of light absorption or dosage of the light, varies depending on the wavelengths. As a vehicle for the analysis of the spectral characteristic, the wavelength of light at which the smallest quantity of light is absorbed is defined as a peak wavelength, and the wavelength of light at which the largest quantity of light is absorbed is defined as a bottom wavelength. The spectral absorption ratio calculating unit 8 calculates a ratio of a quantity of light of an arbitrary wavelength and a quantity of light of the peak wavelength or the bottom wavelength. The peak wavelength is least affected by the film thickness, while the bottom wavelength is most affected by the same. Here, the ratio of the wavelengths is used for minimizing variation factors that are caused by variations of states in the related optical system, e.g., a quantity variation of light of the light source, a length variation of the optical path, and the like, and reflectivity differences of the substrate surfaces of different intermediate products 1 as objects to be measured. In FIG. 2, the spectral absorption ratio of a wavelength A and the peak wavelength is expressed by $L_A/L_p$ where $L_A$ is a quantity of light of a wavelength A and $L_p$ is a quantity of light of the peak wavelength. The spectral absorption ratio calculating unit 8 calculates the spectral absorption ratios of the peak wavelength and the wavelengths A, B, and C, and the bottom wavelength.

The thickness converting unit 9 calculates the thickness of the layer under measurement, and the characteristic value being dependent on the film thickness by using the multiple regression equation, stored in the multiple regression memory 10. In this case, some spectral absorption ratios, derived from the multiple regression memory 10, are used as explanatory variables. The multiple regression memory 10 may be a memory device, for example, a magnetic disc.

The multiple-regression equation is a linear equation using a plural number of variables, and generally is expressed by $$y = a_1 x_1 + a_2 x_2 + \ldots a_p x_p + a_0.$$

In the above expression, x1, x2, . . . , xp are called explanatory variables, and may be spectral absorption ratios derived from the spectrum. "y" is called an object variable, and may be the thickness of the layer under measurement and the characteristic value being dependent on the layer thickness. a0 is a constant term, and a1, a2, . . . , ap are regression coefficients that are set in advance in accordance with the object variable.

In the case where the object variable is the thickness of the charge generating layer, for example, the cross section of an intermediate product 1 of which the spectral absorption ratio as an explanatory variable is photographed in an enlarged fashion by a transmission electron microscope, and the thickness of the charge generating layer or the object variable is obtained. The measurement result is subjected to the multivariate analysis where the layer or film thickness is an object variable and spectral absorption ratios are explanatory variables. From among the combinations of the film thickness and the spectral absorption ratios, the combination having a high multiple correlation coefficient is selected. By the selection, a multiple regression equation can be obtained of which the object variable is the thickness of the charge generating layer. The thus obtained multiple regression equation is stored in the multiple regression memory 10. In evaluating the layer thickness, the multiple regression equation is calculated using the spectral absorption ratios as the explanatory variables, thereby obtaining the thickness of the charge generating layer as the object variable. The multiple regression equation of which the object variables are the thickness of other layers, i.e., the charge transfer layer and the under coat layer, can be formed in similar ways.

The reason why the multiple regression equation is used follows. The characteristic values, such as the correlation of the spectral absorption ratio to the thickness of the charge generating layer, and a degree of the influence by a disturbance that arises from the surface roughness of the conductive substrate, vary depending on the wavelength. The multiple regression equation can concurrently handle both the conversion of the characteristic values to the thickness of the charge generating layer and the disturbance correction, by using a plural number of wavelengths. If an index for indicating a degree of roughness on the surface of the conductive substrate, for example, a surface roughness, is known, it may be used as an additional explanatory variable. Characteristic value being dependent on the thickness of the layers of the photoreceptor (e.g., a characteristic value of an electrical characteristics of the photoconductor, for example; more exactly a photo sensitivity potential indicative of a potential drop when it is exposed to light) may also be used for the object variables of the multiple regression equation. In the above-mentioned embodiment, the multiple regression analysis is used; however, another suitable statistical analysis, for example, a multi-regression analysis, may be used instead of the former.

An operation of the thus constructed first embodiment of the present invention will be described. Light is emitted from the light source 6, goes through the optical fiber 4 and the probe 3, and reaches the detecting area 2 of the intermediate product 1. After reaching the detecting area 2, the light passes successively through the layers formed on the conductive substrate, and is reflected on the surface of the conductive substrate, and passes through the same route in the reverse direction and returns to the probe 3. After reaching the probe 3, the light passes through the optical fiber 4 and is focused on the spectrophotometer 5. As a result, the spectrum of the reflecting light as shown in FIG. 2 may be gathered by the spectrophotometer 5.

The spectrum gathered is sent to the spectral absorption ratio calculating unit 8 of the film-thickness calculating section 7. Some spectral absorption ratios are calculated in the spectral absorption ratio calculating unit 8. The thickness converting unit 9 substitutes the spectral absorption ratios derived from the spectral absorption ratio calculating unit 8 into the multiple regression equation, which is stored in advance in the multiple regression memory 10, thereby to produce the film thickness or the characteristic value being dependent on the film thickness.

In the embodiment mentioned above, a single location on the surface of the product 1 is subjected to the measurement. If required, a plural number of locations on the product surface may be subjected to the measurement. One of the methods to realize this is to vertically move the intermediate product 1 and the probe 3 while at the same time to turn the intermediate product 1. In this case, the measurement may be made over the entire surface of the intermediate product 1.

Additionally, it is noted that the optical measurement is applied to the product after the formation of the layers is completed, and that the measurement result is based on the spectral absorption ratio. Therefore, the measurement is stably performed and the measurement results are reliable.

The film thickness thus obtained and the characteristic value being dependent on the film thickness may directly be visualized by a display device, a printer or the like. Further, the characteristic value may be presented in the form of good or no good if a preset level is set and the characteristic value are compared with the preset level. The characteristic value may be fed back to the layer forming process, and be used for controlling the process. The measurement results thus obtained enable one to manage the film thickness.

Accordingly, the manufacturing process is stably carried out, and it is possible to prevent a large number of defective products from flowing to the subsequent process steps. In other words, the above-mentioned embodiment of the present invention also succeeds in providing a method and an apparatus for manufacturing photoreceptors, which have such advantageous features.

FIG. 3 is a diagram schematically showing a second embodiment of an evaluation apparatus for evaluating a photoreceptor according to the present invention. In the figure, like reference numerals designate like or equivalent portions in FIG. 1, for simplicity. Reference numeral 11 designates a correlation-curve memory. In the first embodiment, the multiple regression equation was used for obtaining the film thickness and the characteristic value that depend on the film thickness. In the second embodiment, a linear regression equation will be used in place of the multiple regression equation.

Also in the second embodiment, the spectrophotometer 5 produces a spectral characteristic as shown in FIG. 2. As seen from the spectrum produced by the spectrophotometer 5, light is absorbed by the films, and the dosage of light depends on the wavelengths. As already referred to, in recent photoreceptors, a roughness of the substrate surface thereof and the interfaces of the under coat layer is set at high values. When light is projected on the photoreceptor surface, and a spectrum of the reflecting light is gathered, and the spectrum is used for the layer thickness evaluation, the interference of light is inevitably avoided. In such a case, the composing of a waveform of light absorbed by the layer under measurement and a waveform of light from the under coat layer brings about no distortion of the waveform. Therefore, only the waveform of the light from the layer under measurement may be extracted. In other words, it is possible to gather the spectrum of light absorbed by the film or layer at an arbitrary location within an image forming area on the intermediate product 1 of the photoreceptor.

The spectral absorption ratio calculating unit 8 calculatively obtains, on the basis of the spectrum received from the spectrophotometer 5, a ratio of a quantity of light of an arbitrary wavelength and a quantity of light of a peak wavelength which provides the largest quantity of light, or a bottom wavelength which provides the smallest quantity of light. That is, the unit 8 calculates a spectral absorption ratio. With the use of the spectral absorption ratio, variation factors are minimized which are caused by variations of states in the related optical system, e.g., a quantity variation of light of the light source, a length variation of the optical path, and the like, and reflectivity differences of the substrate surfaces of different intermediate products 1 as objects to be measured. It enables a dosage of light absorbed by the under-measurement layer in a system that is not discrete spatially and in time to be qualitatively expressed. In the embodiment, the spectral absorption ratio is calculated using a quantity of light of the peak wavelength of which the absorption is the largest and a quantity of light of an arbitrary wavelength of which the absorption is relatively large.

Let us lead a spectral absorption ratio from a general equation describing a dosage of light, given by the following equation.

$$Lo = Li \times exp(-\mu d) \times Lb$$

where $Lo$=quantity of reflecting light
$Li$=quantity of incident light
$\mu$=absorption coefficient
$d$=thickness of a layer
$Lb$=reflectivity of the substrate surface.

A ratio of the quantities of reflecting light of two wavelengths of which the absorption coefficients are different from each other will be discussed using the above equation. A ratio of the quantities Lox and Loy of the reflecting light of two wavelengths X and Y are given by $$(Loy/Lox) = (Li \times \exp(-\mu_x d) \times Lb)/(Li \times \exp(-\mu_y d) \times Lb)$$
$$= \exp(-\mu_x d)/\exp(-\mu_y d)$$

where Li=quantity of incident light
$\mu_x$=absorption coefficient of the wavelength X
$\mu_y$=absorption coefficient of the wavelength Y
d=film thickness
Lb=reflectivity of the substrate surface It is noted here that the incident light Li and the reflectivity Lb of the substrate surface are not contained in the above equation. This fact implies that a dosage of light can be described independently of a variation of the quantity of the incident light caused by-a variation of the quantity of light from the light source and a variation of the optical path length, and further a variation of the reflectivity of the substrate surface.

The thickness converting unit 9 substitutes spectral absorption ratios, which are derived from the spectral absorption ratio calculating unit 8, into a correlation curve equation that is stored in the correlation-curve memory 11, thereby to obtain the thickness of the layer under measurement and various characteristic value that depend on the film thickness. The correlation-curve memory 11 may be a memory device, for example, a magnetic disc.

The correlation curve equation to be stored into the correlation-curve memory 11 may be obtained in a manner that the cross sections of a plural number of samples of intermediate products 1 are photographed in an enlarged fashion by a transmission electron microscope, and the thickness of the layers to be measured is measured, and the measurement results of the spectral absorption ratios are obtained as mentioned above, and a relation of the film thickness and the spectral absorption ratios is obtained by the linear regression.

Thus, the spectrum of the reflecting light from the intermediate product 1 having the layers formed on the substrate layer is converted into spectral absorption ratios in the spectral absorption ratio calculating unit 8, and the spectral absorption ratios are substituted into the correlation curve equation previously obtained. As a result, the film thickness and the characteristic value dependent on the film thickness can be obtained accurately and stably. A single location on the surface of the intermediate product 1 is subjected to the measurement in the second embodiment, but a plural number of locations on the product surface or the entire product surface may be subjected to the measurement.

As described above, the second embodiment of the present invention can exactly evaluate a state of the intermediate product during the process of forming the layers of the photoreceptor. Accordingly, an abnormal state in the film forming process is quickly detected, the process is stably carried out and it is possible to prevent a large number of defective products from flowing to the subsequent process steps.

The first embodiment of the present invention thus described will be described in more detail while using a specific example thereof. A multiple regression equation of which the object variable is the thickness of the charge generating layer of a photoreceptor and the explanatory variable is the spectral absorption ratio, was set up. To set up the multiple regression equation, the surface roughness Ra was used for an index for indicating a roughness on the surface of the conductive substrate. Two factorial levels, C1 $\mu$m and C2 $\mu$m, were set up for the thickness values of the charge generating layer. Two factorial levels, B1 $\mu$m and B2 $\mu$m, were set up also for the thickness values of the under coat layer. Eight intermediate products 1 were manufactured according to the cross conditions of the factorial levels. Further, nine intermediate products 1 were manufactured according to the combination of the following conditions: the surface roughness A3 $\mu$m, the thickness B3 $\mu$m of the under coat layer, the thickness C3 $\mu$m of the charge generating layer, and the thickness D3 $\mu$m of the charge transfer layer (These values A3, B3, C3, and D3 are medium values of the factorial levels.). The factorial level values are target values at the time of layer coating, not actually measured values. Actually, the factorial levels vary depending on a coating rate. The evaluation apparatus shown in FIG. 1 was used. Light was applied from the light source 6 to the detecting area 2 on the intermediate product 1 by way of a route of the optical fiber 4 and the probe 3. Light reflected from the substrate surface in the detecting area 2 was led to and imaged on the spectroscope of the spectrophotometer 5 by way of a reverse route of the probe 3 and the optical fiber 4. The spectrophotometer 5 produced a spectrum of the reflecting light from the detecting area 2.

The spectrum was applied to the spectral absorption ratio calculating unit 8 in the film-thickness calculating section 7. The spectral absorption ratios were calculated by the spectral absorption ratio calculating unit 8. The light source 6 was a halogen light source. A wavelength width used was a visible rays region of 400 nm to 800 nm. The wavelengths were segmented at the steps of 10 nm. Each spectral absorption ratio was obtained as a ratio of the peak wavelength and the bottom wavelength. The cross sections of the samples of the intermediate products 1 were photographed in an enlarged fashion by a transmission electron microscope, and the thickness values of the actual charge generating layers were measured.

The structure parameters of the photoreceptor for the spectral absorption ratios, viz., the factorial effects of the surface roughness, the under coat layer thickness, and the charge generating layer thickness as the sample forming conditions, were examined using the thus obtained data of the spectral absorption ratios and the film thickness. It was confirmed that a degree of the factorial effect by the surface roughness and the charge generating layer thickness varied with the wavelength. Further, it was confirmed that the factorial effect by the under coat layer thickness was not found in any of the wavelengths.

A multiple regression equation, of which the object variable is the charge generating layer thickness and the explanatory variable is the spectral absorption ratio, was set up by a multivariable analysis technique. The spectral absorption ratios selected for the object variables in the multiple regression equation were those having high multiple correlation coefficients. The spectral absorption ratios were obtained using the quantities of light at the peak and bottom wavelengths, and the wavelengths A, B and C shown in FIG. 2. FIGS. 4A and 4B are explanatory diagrams for explaining a multiple regression equation used in the first embodiment of the present invention. The obtained multiple regression equation, as shown in FIG. 4A, was $$y=a1x1+bx2+cx3+dx4+ex5+f$$

The explanatory variables were the spectral absorption ratios and the surface roughness, as shown in FIG. 4B. The coefficients a to f were obtained by the multivaraible analysis, while using the spectral absorption ratios gained from the samples, the surface roughness, and the actually measured thickness of the charge generating layers. In the multiple regression equation obtained, the coefficients a to f were constants. For an automatic calculation of the film thickness, the multiple regression equation was stored into the multiple regression memory 10 in the film-thickness calculating section 7.

The intermediate product 1 was manufactured. To manufacture it, the surface of the conductive substrate was processed for preventing interference fringes. An under coat layer, a charge generating layer, and the like were layered on the thus surface processed conductive substrate. The resultant product 1 was measured by the spectrophotometer 5. The spectral absorption ratios were calculated from the spectrum produced from the spectrophotometer 5. The spectral absorption ratios were substituted into the multiple regression equation, stored in the multiple regression memory 10. In this way, the thickness of the charge generating layers of the photoreceptor were exactly anticipated and evaluated.

The second embodiment of the present invention thus described will be described in more detail while using a specific example thereof. To obtain the thickness of the charge generating layer of the photoreceptor, five factorial levels, d1 $\mu$m to d5 $\mu$m, were set up for the thickness values of the charge generating layer. Three factorial levels, r1 $\mu$m to r3 $\mu$m, were set up for the surface roughness values of the conductive substrate. Three factorial levels, u1 $\mu$m to u3 $\mu$m, were set up also for the thickness values of the under coat layer. 45 number of products 1 were manufactured according to the cross conditions of the factorial levels. Here, the surface roughness is a characteristic value as an index normally used for evaluating a degree of roughness on the surface of the charge generating layer when the surface thereof is made rough by a Horning method. The evaluation apparatus shown in FIG. 3 was used. Light was applied from the light source 6 to the detecting area 2 on the intermediate product 1 by way of a route of the optical fiber 4 and the probe 3. Light reflected from the substrate surface in the detecting area 2 was led to and imaged on the spectroscope of the spectrophotometer 5 by way of a reverse route of the probe 3 and the optical fiber 4. The spectrophotometer 5 produced a spectrum of the reflecting light from the detecting area 2.

The spectrum was applied to the spectral absorption ratio calculating unit 8 in the film-thickness calculating section 7. The spectral absorption ratios were calculated by the spectral absorption ratio calculating unit 8. The light source 6 was a halogen light source. A wavelength width used was a visible rays region of 400 nm to 800 nm. The wavelengths were segmented at the steps of 10 nm. Light quantity data of the wavelengths were obtained, and the spectral absorption ratios were obtained as ratios of the light quantities of the wavelengths. The cross sections at the spectral absorption spectrum gathering locations of the intermediate products 1 were photographed in an enlarged fashion by a transmission electron microscope, and the thickness values of the actual charge generating layers were measured.

To evaluate a degree of the effect of the under coat layer thickness and the surface roughness of the conductive substrate on the spectral absorption ratio, and a sensitivity of the spectral absorption ratio to the charge generating layer thickness, the factorial effects were examined using the thus obtained data of the spectral absorption ratios and the film thickness. As the result of the examination, it was confirmed that the factorial effect by the under coat layer thickness and the surface roughness of the conductive substrate was not found in any of the wavelengths. Further, the spectral absorption ratio of the wavelength having the highest sensitivity to the charge generating layer thickness was specified, and a correlation curve to convert it into a real film thickness was obtained by the linear regression. For an automatic calculation of the film thickness, the correlation curve obtained was stored into the correlation-curve memory 11.

The intermediate product was manufactured. To manufacture it, the surface of the conductive substrate was processed for preventing interference fringes. An under coat layer, a charge generating layer, and the like were layered on the thus surface processed conductive substrate. The resultant product was measured by the spectrophotometer. The spectral absorption ratios were calculated from the spectrum produced by the spectrophotometer. The spectral absorption ratios were substituted into the correlation curve equation, stored in the correlation-curve memory. In this way, the thickness of the charge generating layers of the photoreceptor were exactly anticipated and evaluated while being little affected by variations of the optical system. Further, the nonuniformity of the film thickness values, the slack of the photoreceptor, and the like could be evaluated by measuring the film thickness at a plural number of locations on the product 1.

As seen from the foregoing description, in a method and an apparatus for evaluating an electrophotographic photoreceptor according to the present invention, the thickness of the layer to be evaluated or the feature quantity on the layer thickness are obtained on the basis of the spectral absorption ratios obtained from the spectral characteristic of the reflecting light from the intermediate product. Therefore, the measurement results can exactly and stably be obtained without being affected by variations in the optical system, for example. Accordingly, the film thickness of the photoreceptor of the intermediate product can exactly be evaluated during the process of manufacturing the product.

To obtain the thickness of the layer to be evaluated or the feature quantity on the layer thickness, as set forth in aspects 2 and 9, a regression equation may be used in which the spectral absorption ratios obtained from the spectral characteristic of the reflecting light from the intermediate product are used for the explanatory variables, and the thickness of the layer to be evaluated or the feature quantity on the layer thickness is the object variable. Particularly, as set forth in aspects 3 and 10, a spectral absorption ratio of the minimum absorption wavelength and an arbitrary wavelength may be used. As set forth in aspects 4 and 11, the thickness of the layer to be evaluated or the feature quantity on the layer thickness may be calculated by using a multiple regression equation in which the spectral absorption ratios obtained from the spectral characteristic of the reflecting light from the intermediate product are used for the explanatory variables, and the thickness of the layer to be evaluated or the feature quantity on the layer thickness is the object variable. When the regression equation is used, the conversion of the spectral absorption ratios into the thickness of the layer to be evaluated or the feature quantities on the layer thickness and the disturbance correction can concurrently be performed. As set forth in aspects 5 and 12, when the surface roughness on the conductive substrate is additionally used for the explanatory variable, the measurement can be performed independently of a variation of the surface roughness of the conductive substrate.

The method and the apparatus for evaluating an electrophotographic photoreceptor according to the present invention enables one to stably and exactly obtain the layer thickness or the feature quantities on the layer thickness. The characteristic value may be fed back to the layer forming process, and be used for controlling the process. Accordingly, a variation in the process can quickly be detected, so that the manufacturing process is stable, and it is possible to prevent a large number of defective products from flowing to the subsequent process steps.

What is claimed is:

1. An apparatus for evaluating an object having layers formed on a substrate comprising:

spectral characteristic detecting means for detecting the spectral characteristic of light reflected from the surface of the object having at least a layer to be evaluated being formed thereon; and calculating means for generating spectral absorption ratios on the basis of the spectral characteristic received from said spectral characteristic detecting means and for calculatively processing the spectral absorption ratios by using a regression equation to produce the thickness of the layer to be evaluated or the characteristic value on the layer thickness.

2. The evaluating apparatus of claim 1 wherein:

the calculating means uses a regression equation of which explanatory variables are the spectral absorption ratios and an object variable is the thickness of the layer to be evaluated or the characteristic value of the layer thickness.

3. The evaluating apparatus of claim 1 wherein:

the calculating means uses a regression equation of which explanatory variables are the spectral absorption ratios defined by the minimum absorption wavelength and an object variable is the thickness of the layer thickness.

4. The evaluating apparatus of claim 1 wherein:

the calculating means uses a multiple regression equation of which explanatory variables are the spectral absorption ratios and an object variable is the thickness of the layer to be evaluated or the characteristic value on the layer thickness.

5. The evaluating apparatus of claim 1 wherein:

the calculating means uses a multiple regression equation of which explanatory variables are the spectral absorption ratios and a surface roughness of said substrate and an object variable is the thickness of the layer to be evaluated or the characteristic value on the layer thickness.

6. The evaluating apparatus of claim 1, wherein said object having layers formed on a substrate is a photoreceptor.

7. The evaluating apparatus of claim 6, wherein said substrate is processed in advance for preventing interference fringes.

8. An apparatus for manufacturing photoreceptors having a plural number of layers formed on a substrate comprising the evaluating apparatus of claim 6;

the result of the evaluation performed by said evaluating apparatus being fed back to the process of forming the layer to be evaluated.

9. An apparatus for measuring the thickness of at least one layer formed on a substrate, comprising:

spectral characteristic detecting means for detecting the spectral characteristic of light reflected from a surface of the substrate having the at least one layer formed thereon; and calculating means for generating spectral absorption ratios on the basis of the spectral characteristic received from said spectral characteristic detecting means and for processing the spectral absorption ratios to determine the thickness of the at least one layer.

10. The apparatus of claim 9, wherein the calculating means uses a regression equation to determine the thickness of the layer.

11. The apparatus of claim 9, wherein the calculating means uses a regression equation of which explanatory variables are the spectral absorption ratios and an object variable is the thickness of the layer.

12. The apparatus of claim 9, wherein the calculating means uses a regression equation of which explanatory variables are the spectral absorption ratios defined by the minimum absorption wavelength and an object variable is the thickness of the layer.

13. The apparatus of claim 9, wherein a plurality of layers are formed on the substrate and the calculating means determines the thickness of at least one of the plurality of layers.

* * * * *